(12) United States Patent
Tang et al.

(10) Patent No.: US 7,636,834 B2
(45) Date of Patent: Dec. 22, 2009

(54) METHOD AND APPARATUS FOR RESETTING A GRAY CODE COUNTER

(75) Inventors: Chengfuh Jeffrey Tang, Saratoga, CA (US); Jiann-Tsuen Chen, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 1043 days.

(21) Appl. No.: 10/302,489

(22) Filed: Nov. 21, 2002

(65) Prior Publication Data

US 2003/0164836 A1 Sep. 4, 2003

Related U.S. Application Data

(60) Provisional application No. 60/361,163, filed on Mar. 1, 2002.

(51) Int. Cl.
*G06F 13/00* (2006.01)
*G11C 7/10* (2006.01)
*G06F 5/00* (2006.01)

(52) U.S. Cl. .................. 711/219; 711/166; 365/221; 345/556; 345/558; 710/53

(58) Field of Classification Search ............... 711/159, 711/166, 219; 377/34; 365/221; 345/558, 345/556; 710/53
See application file for complete search history.

(56) References Cited

U.S. PATENT DOCUMENTS

| | | | | |
|---|---|---|---|---|
| 4,780,894 A | * | 10/1988 | Watkins et al. | 377/34 |
| 5,103,499 A | * | 4/1992 | Miner et al. | 345/503 |
| 5,365,485 A | * | 11/1994 | Ward et al. | 365/221 |
| 5,426,756 A | * | 6/1995 | Shyi et al. | 711/159 |

\* cited by examiner

*Primary Examiner*—Matt Kim
*Assistant Examiner*—Mardochee Chery
(74) *Attorney, Agent, or Firm*—McAndrews, Held & Malloy, Ltd.

(57) ABSTRACT

Aspects of the invention may include gradually decrementing or incrementing a write pointer (370) associated with a data buffer such as the FIFO buffer (310) until a reset value of the write pointer (370) is reached in response to an indication that a data buffer controlled by the gray code counter is empty. Additionally, a read pointer (380) associated with the data buffer (310) may be gradually incremented or decremented until a reset value of the read pointer (380) is reached in response to an indication that the data buffer controlled by the gray code counter is full. The data buffer may be a first-in-first-out (FIFO) buffer such as FIFO buffer 310, which may be asynchronously clocked. The data buffer may be adapted to buffer any one or a combination of video, voice and data.

26 Claims, 3 Drawing Sheets

METHOD AND APPARATUS FOR RESETTING A GRAY CODE COUNTER

CROSS-REFERENCE TO RELATED APPLICATION/INCORPORATION BY REFERENCE

This application makes reference to, claims priority to and claims the benefit of U.S. Provisional Patent Application Ser. No. 60/361,163 filed on Mar. 1, 2002.

The above stated application is incorporated herein by reference in its entirety.

BACKGROUND OF THE INVENTION

Certain embodiments of the present invention relate to processing of buffered digital signals. More specifically, certain embodiments relate to a method and apparatus for resetting a gray code counter associated with a video, voice and/or data buffer.

A gray code is a binary code in which consecutive decimal numbers are represented by a binary expression that differ in the state of one (1), and only one (1) bit. Accordingly, a gray code counter is a counter in which each successive binary count differs by one bit.

FIG. 1 is an exemplary finite state machine (FSM) 100 that may be used to implement a gray code counter. Referring to FIG. 1, the finite state machine 100, for example, may be used to implement a 4-bit counter, which may range from zero (0) to fifteen (15). Initial state 102 may represent binary state 0000 and a final state 110 may represent binary state 1000. Each consecutive state between initial binary state 102 and final state 110 vary by only one (1) bit. For example in state 104, a consecutive state to the initial state 102, only the least significant bit, bit four (4) changes. Similarly, in state 106, a consecutive state to the state 104, only the bit next to the least significant bit, bit three (3), changes. Similar single bit changes occur until the final binary state 110 is reached. At this point, a reset or a rollover occurs to the initial state 102, in which the binary values of the gray code counter changes from 1000 to 0000.

In certain applications, it might be advantageous to switch a single bit in any clock instant. For example, in integrated circuits (ICs), which may be prone to noise or which require a low noise environment for optimal operation or performance, gray code counters may be preferable over binary counters, the latter of which switches more than one bit at any clock instant. In general, the greater the number of bits being switched, the greater the amount of noise generated since each bit transition generates noise. Similarly, the lesser the number of bits number being switched, the lesser the amount of generated noise since there are less transitions to generate noise.

In general, gray code counters may be sampled asynchronously at any time during a given clock period. In this regard, since only one bit changes during any given transition, a maximum sampling error for a gray code counter is one (1). With binary counters, however, errors may occur with asynchronous sampling since some flip-flops (FF) used to implement the binary counter may have transitioned prior to or subsequent to a sampling instant. In this case, if the sampling instant occurs at or near a rising edge or a falling edge of a clock, then some FFs may have transitioned before others, thereby causing the errors.

Gray code counters may be particularly useful in applications that include, but are not limited to, asynchronous video, voice and data communication. In this regard, a gray code counter may be utilized for accessing certain video, voice and/or data buffers. In such applications, particularly with video applications, impairments such as noise and/or transients may cause errors in the gray code counter. In particular, since asynchronous clock signals may be used to control the buffers, a reset of the gray code counter may cause a non-gray code transition, which may result in glitching. In this case, the buffer may enter an undesired state, thereby causing a buffer status error.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention afford an approach to reset a gray code counter without generating flags that falsely indicate a state of a data buffer. A method for resetting a gray code counter may include, gradually decrementing or incrementing a write pointer associated with the data buffer until a reset value of the write pointer is reached in response to an indication that a data buffer controlled by the gray code counter has attained one of a plurality specified states. Additionally, a read pointer associated with the data buffer may be gradually incremented or decremented until a reset value of the read pointer is reached in response to an indication that the data buffer controlled by the gray code counter has attained one of the plurality of specified states. The specified states may include full, empty and one or more predefined states indicating various levels between empty and full. The data buffer may be a first-in-first-out (FIFO) buffer, which may be asynchronously clocked. The data buffer may be adapted to buffer video, voice and/or data.

In another embodiment of the invention, a method for resetting a gray code counter is provided. The method may include disabling any attempt to write to the data buffer until a reset value of a write pointer controlling the data buffer is reached in response to an indication that a data buffer controlled by the gray code counter has attained one of a plurality specified states. Additionally, any attempt to read from the data buffer until a reset value of a read pointer controlling the data buffer is reached may be disabled in response to an indication that the data buffer controlled by the gray code counter has attained the one of a plurality specified states. The specified states may include full, empty and one or more predefined states indicating various levels between empty and full. Disabling any attempt to write to the data buffer may further include disabling generation of at least one flag until the reset value of the write pointer controlling the data buffer is reached. Similarly, disabling any attempt to read from the data buffer may further include disabling generation of at least one flag until the reset value of the read pointer controlling the data buffer is reached. The data buffer may be a first-in-first-out (FIFO) buffer, which may be asynchronously clocked. The data buffer may be adapted to buffer at video, voice and/or data.

Another aspect of the invention may include, a machine-readable storage, having stored thereon a computer program having at least one code section executable by a machine for causing the machine to perform the above-mentioned steps in accordance with the various embodiments disclosed.

Another aspect of the invention also provides a system for resetting a gray code counter. The system may include at least one decrementer for gradually decrementing a write pointer associated with the data buffer until a reset value of the write pointer is reached in response to an indication that a data buffer controlled by the gray code counter has attained one of a plurality specified states. At least one incrementer may be provided for gradually incrementing a read pointer or a write pointer associated with the data buffer until a reset value of the read pointer is reached in response to an indication that the data buffer controlled by the gray code counter has attained one of the plurality of specified states. At least one decrementer may be provided for gradually decrementing a read pointer or a write pointer associated with the data buffer until a reset value of the read pointer is reached in response to an indication that the data buffer controlled by the gray code counter has attained one of the plurality of specified states. The specified states may include full, empty and one or more predefined states indicating various levels between empty and full. A flag generator may be provided for comparing an output of a write gray code counter associated with the write pointer and an output of a read gray code counter associated with the read pointer.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a method and system for resetting gray code counters associated with a FIFO video, voice and/or data buffer. In response to an indication that a data buffer controlled by the gray code counter is empty, a write pointer associated with a data buffer such as the FIFO buffer may be gradually decremented or incremented until a reset value of the write pointer is reached. Additionally, in response to an indication that the data buffer controlled by the gray code counter has reached a particular state, a read pointer associated with the data buffer may be gradually incremented or decremented until a reset value of the read pointer is reached. The state may be full, empty or any state defined between empty and full. The data buffer may be an asynchronously clocked a first-in-first-out (FIFO) buffer. The data buffer may be adapted to buffer any one or a combination of video, voice and data.

Figure 1:
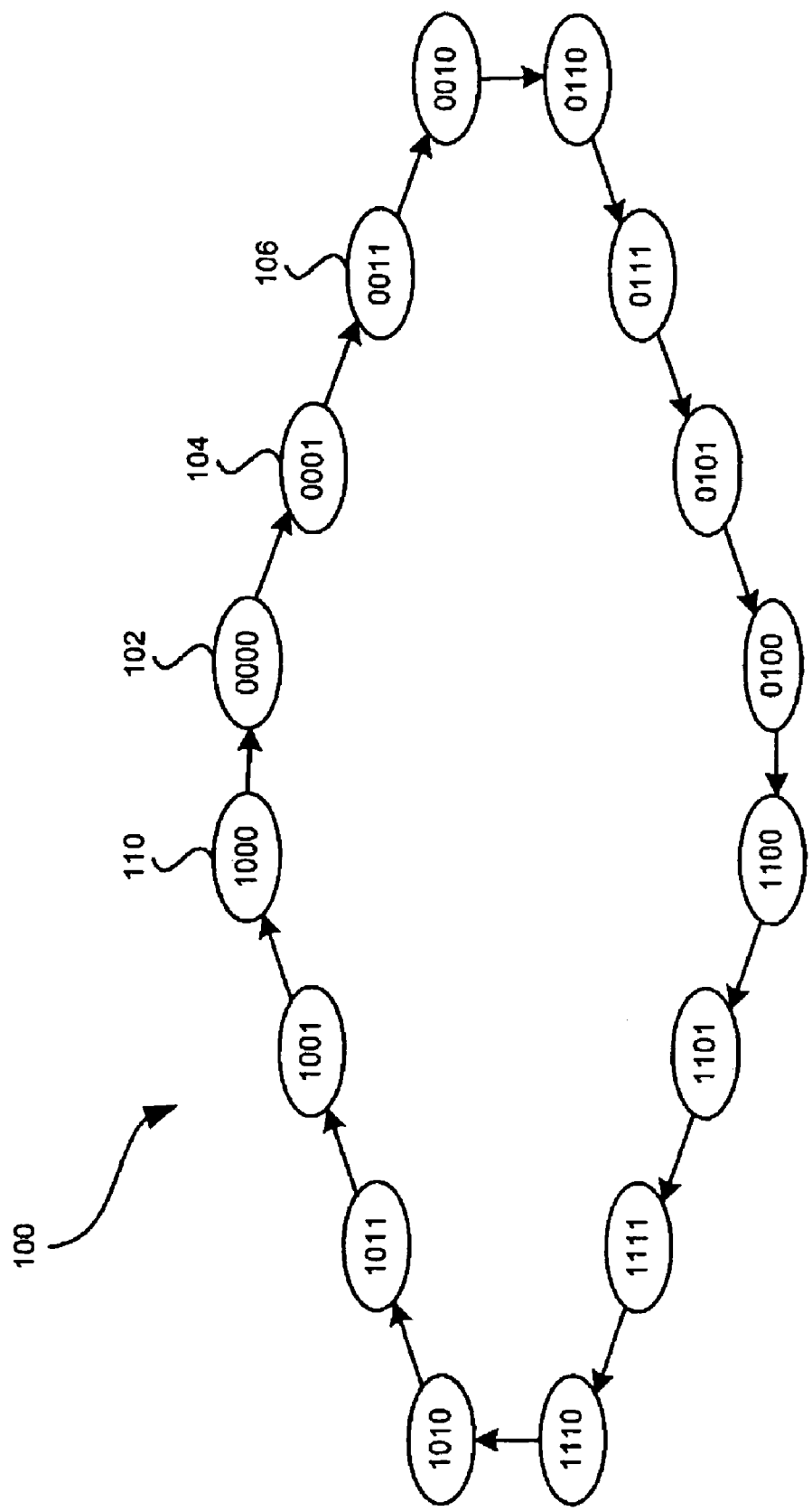
FIG. 1 is an exemplary finite state machine that may be used to implement a gray code counter.
Figure 2:
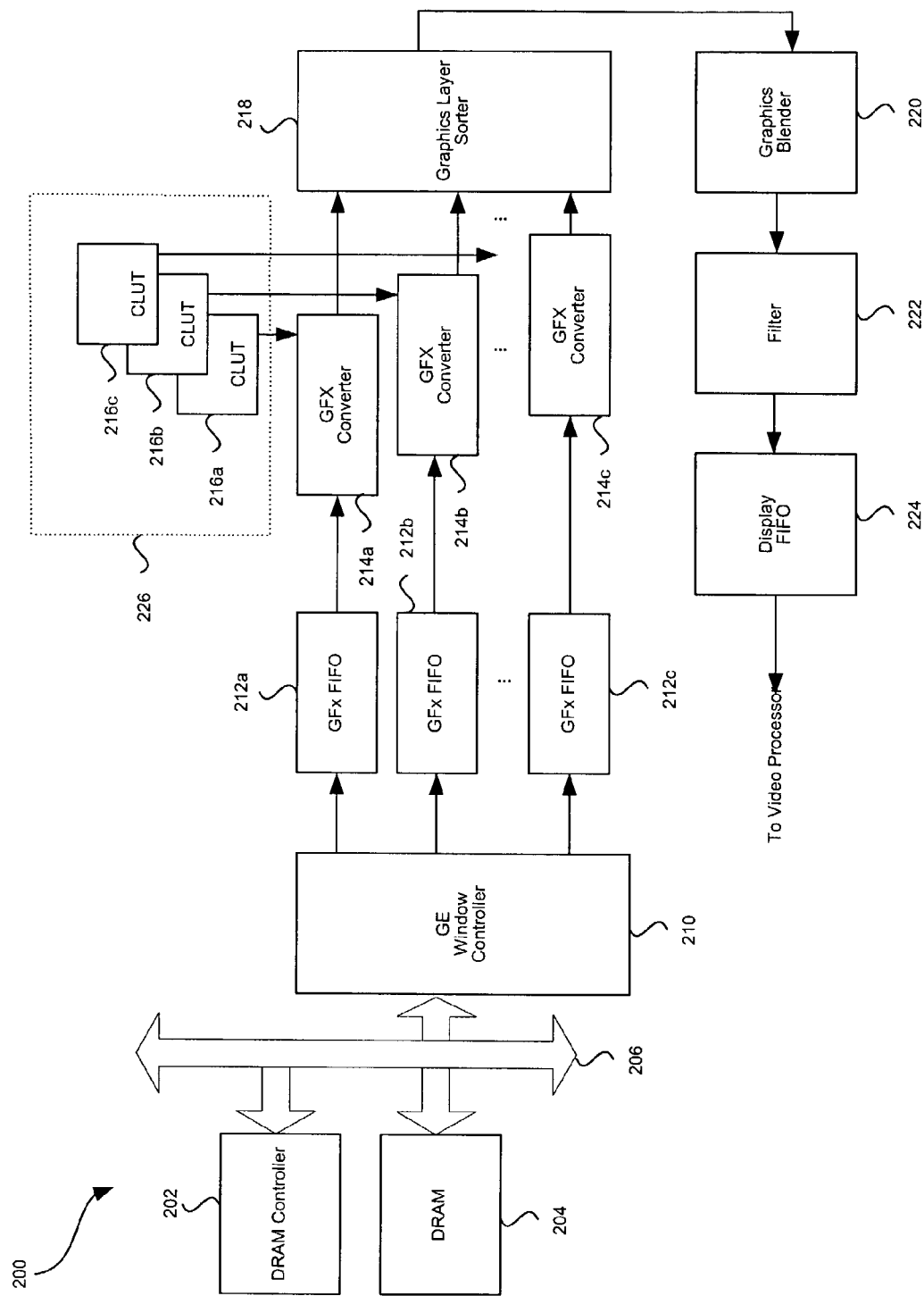
FIG. 2 is a block diagram of an exemplary system that utilizes a video FIFO in accordance with an embodiment of the present invention.

FIG. 2 is a block diagram of an exemplary system that utilizes a video FIFO in accordance with an embodiment of the present invention. Referring to FIG. 2, block diagram 200 may include a DRAM controller 202, a DRAM 204, a bus 206, a graphics engine (GE) window controller 210, graphics (GFx) first-in-first-out (FIFO) buffers 212a, 212b, 212c, graphics converters 214a, 214b, 214c, and color look-up tables (CLUTs) 216a, 216b, 216c. FIG. 2 may also include a graphics layer sorter 218, a graphics blender 220, a filter block 222 and a display FIFO buffer block 224. Although block diagram 200 may include DRAM controller 202 and DRAM 204, the invention is not limited in this regard. Accordingly, any suitable memory or video random access memory (VRAM), controlled by a suitable memory controller or processor may be utilized. The CLUTs 216a, 216b, 216c may be formatted as a data structure and stored in a memory 226 and/or DRAM 104. Memory 226 may be an SRAM, although the invention is not so limited.

DRAM controller 202 and DRAM 204 may be coupled to bus 206 in any suitable manner such as is conventionally known. Alternatively, the graphics layer sorter may be coupled to the DRAM controller 202 instead of the bus 206. GE window controller 210 may be coupled to bus 206. The GE window controller 210 may be adapted to control a plurality of graphics FIFO buffers 212a, 212b, 212c. In this regard, various outputs of the GE window controller 210 may be coupled to an input of each of the graphics FIFOs 212a, 212b, 212c. The output of each of the graphic FIFOs 212a, 212b, 212c may be coupled to an input of a corresponding graphics converter 214a, 214b, 214c. Each graphics converter 214a, 214b, 214c may be adapted to be associated with a corresponding CLUT 216a, 216b, 216c. In this arrangement, there may be a one-to-one association between a graphics FIFO, its corresponding graphics converter and its corresponding CLUT. For example, an output of graphics FIFO 212a may be coupled to an input of graphics converter 214a, which may have an associated corresponding CLUT 216a. An output of graphics FIFO 212b may be coupled to an input of graphics converter 214b, which may have an associated corresponding CLUT 216b. An output of graphics FIFO 212c may be coupled to an input of graphics converter 214c, which may have an associated corresponding CLUT 216c.

An output of each of the graphics converters 214a, 214b, 214c may be coupled to one or more inputs of graphics layer sorter 218. Graphics blender 220 may be adapted to receive an output of the graphics layer sorter 218. An output of the graphics blender 220 may be coupled to a filter block 222, which may include at least one filter element. The output of the filter block 222 may be coupled to an input of display FIFO block 224. The display FIFO block 224 may include one or more display FIFO buffers. Finally, an output of the display FIFO 224 may be coupled to a video-processing element such as a video processor (not shown).

DRAM 204 may be adapted to stored graphics image data. The DRAM controller 202 may be configured to control the transfer of graphics image data to and from the DRAM 204 via, for example, bus 206. In one embodiment of the invention, DRAM controller 202 may be used to control the transfer of graphics image data from the DRAM 204 to the GE window controller 210. The GE window controller 210 may be adapted to control a manner in which graphics images may be displayed over the complete viewing portion of a video display terminal. GE window controller 210 may be adapted to control display attributes for the viewable portion of the video display terminal such as the display height, display width, aspect ratio and any special formatting. The GE window controller 210 may be adapted to control a manner in which each line of the viewing portion of the video display terminal may be displayed. GE window controller 210 may be adapted to control line attributes for each line to be displayed on the video display terminal. These attributes may include, but are not limited to, the start of a line, the end of a line and any special formatting that the line may possess. Each of the graphics FIFO buffers 212a, 212b, 212c may be adapted to store graphics image data for a particular line to be display on the video display terminal.

Each of the corresponding graphics converters 214a, 214b, 214c may be adapted to interpret graphics image data received from the connected graphics FIFO. Based on the received graphics image data, each of the graphics converters 214a, 214b, 214c may consult their associated corresponding CLUT 216a, 216b, 216c respectively, to acquire color information pertaining to a particular pixel for a line to be displayed. For example, based on the graphics image data for a particular line received from graphics FIFO 212a, graphics converter 214a may consult its associated corresponding CLUT 216a to acquire color information pertaining to a particular pixel for the line to be displayed. Based on the graphics image data for a particular line received from graphics FIFO 212b, graphics converter 214b may consult its associated corresponding CLUT 216b to acquire color information pertaining to a particular pixel for the line to be displayed. Finally, based on the graphics image data for a particular line received from graphics FIFO 212c, graphics converter 214c may consult its associated corresponding CLUT 216a to acquire color information pertaining to a particular pixel for the line to be displayed.

Graphics layer sorter 218 may be adapted to receive processed output graphics image data from the graphics converters 214a, 214b, 214c and may accordingly sort various portions of the graphic image for overlay based on the data received from the graphic converters 214a, 214b, 1154c. In this regard, graphics layer sorter 218 may be adapted to add spatial depth to the processed image data. Graphics blender 220 may receive a sorted layer output from the graphics layer sorter 218 and accordingly merge or overlay the various layers of the graphics image.

Filter block 222 may include one or more post-processing filters that may be adapted to filter out any unwanted or undesirable effects. For example, filter block 222 may include a post-processing filter that may be adapted to filter out any unwanted high frequency distortion that may distort at least a portion of an output graphic image. The output of the filter block 222 may be buffered in display FIFO 224 before being transferred to a video processor or engine for processing. The video processor or engine may, for example, encode the graphics display data received from the display FIFO 224 in a format suitable for display on the video display terminal. In this regard, the video processor or engine may encode the graphics display in a format such as national television system committee (NTSC), phase alternate line (PAL) and sequential color and memory (SECAM).

Figure 3:
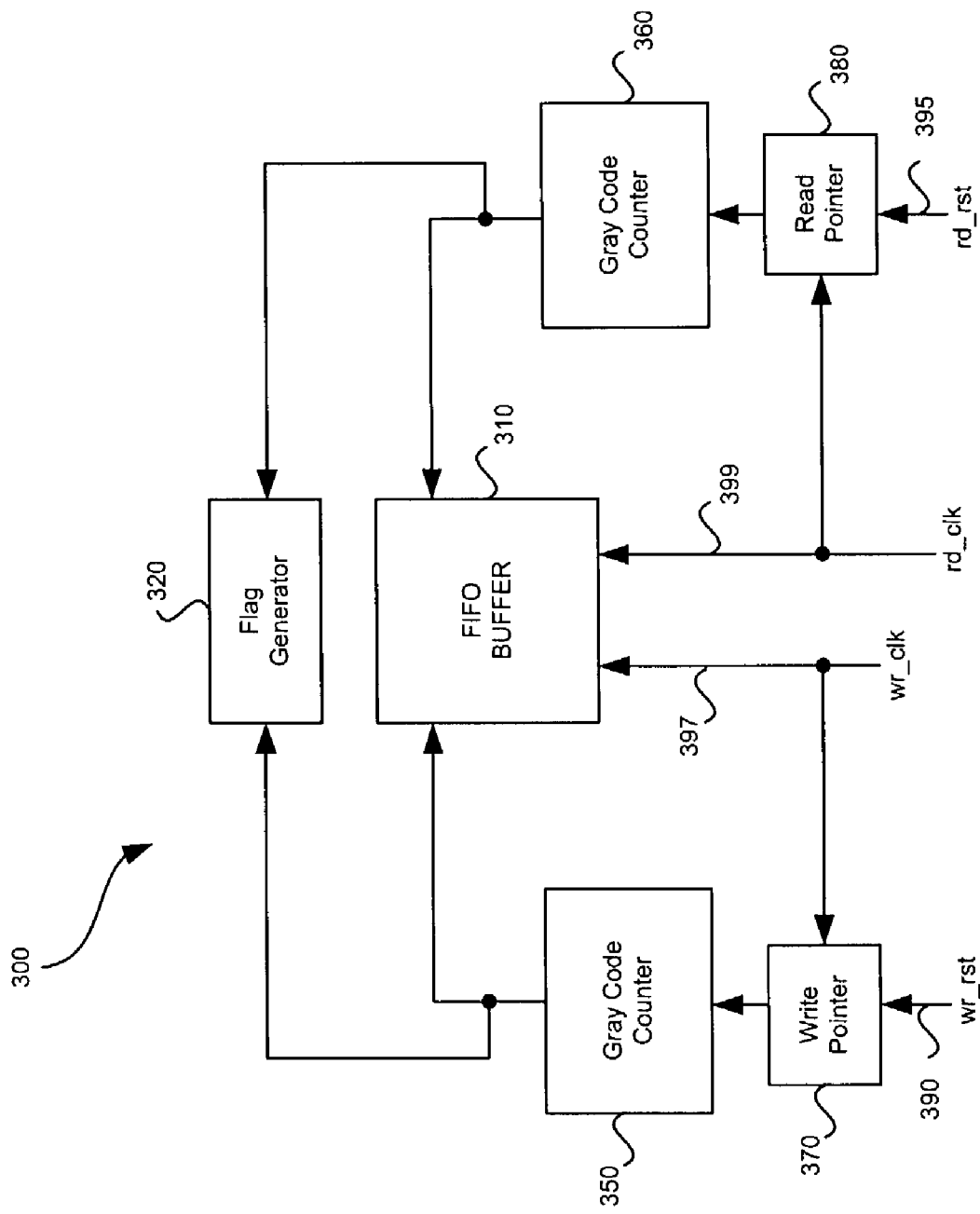
FIG. 3 is a block diagram of an exemplary asynchronous FIFO system including apparatus for resetting gray code counters associated with, for example, a video FIFO, in accordance with an embodiment of the present invention.

FIG. 3 is a block diagram of an exemplary asynchronous FIFO system 300 including apparatus for resetting gray code counters associated with, for example, a video FIFO, in accordance with an embodiment of the present invention. FIG. 3 may include a FIFO buffer 310, a flag generator block 320, a first gray code counter 350, a second gray code counter 360, a write pointer 370, and a read pointer 380. FIG. 3 may also include a write clock (wr_clk) signal 397, a read clock (rd_clk) signal 399, a write reset wr_rst signal 390 and a read reset (rd_rst) signal 395. The first gray code counter 350, the write pointer 370, the write clock wr_clk signal 397, and the write reset wr_rst signal 390 may be collectively referred as the write side. The second gray code counter 360, the read pointer 380 the read clock rd_clk signal 399, and the read reset rd_rst signal 395 may be collectively referred to as the read side.

The FIFO buffer 310 may preferably be an asynchronous FIFO buffer. The read pointer 380 and the write pointer 370 may be registers or memory locations that may be used to store the address or offset to a specified memory location. Flag generator block 320 may include a comparator and other suitable logic circuit that may have the capability to compare the outputs of gray code counters 350, 360. The write clock signal wr_clk 397 may be adapted as an input to the asynchronous FIFO buffer 310 and the write pointer 370. A write-reset wr_rst signal 390 may be coupled as an input to the write pointer 370.

The output of write pointer 370 may be coupled to an input of the gray code counter 350. An output of the gray code counter 350 may be coupled to an input of the flag generator block 320 and an input of the FIFO buffer 310. The read clock signal rd_clk 399 may be adapted as an input to the asynchronous FIFO buffer 310 and the read pointer 380. A read-reset rd_rst signal 395 may be coupled as an input to the read pointer 370. The output of read pointer 380 may be coupled to an input of the second gray code counter 360. An output of the second gray code counter 360 may be coupled an input of FIFO buffer 310 and also to the flag generator block 320.

In an embodiment of the invention, the asynchronous FIFO system 300 may be adapted to handle digital video information in the form of video lines received from, for example, the graphics engine window controller 210 (FIG. 2). In this regard, a line of video data may be clocked into or written into the FIFO buffer 310 and may be clocked out or read out of the FIFO buffer 310 to a memory such as SRAM 226. The graphics FIFOs 212a, 212b and 212c (FIG. 2) may be representative of the FIFO system 300. Writing to the FIFO system 300 and reading from the FIFO system 300 may be achieved in a synchronous manner utilizing two different clock signals, namely wr_clk 397 and rd_clk 399, respectively. Notably, it may be necessary to track various states of the FIFO system 300 in order to ensure that video data does not get inadvertently written to the FIFO system 300 and/or read out of the FIFO system 300 incorrectly.

During operation of the FIFO system 300, the write pointer 370 may be incremented or decremented by the write clock signal 397. The output of the write pointer 370 may be a binary number. This binary number may be converted to a gray code output by gray code counter 350. The gray code output may be a digitally represented output, in which consecutive outputs differ by only one bit change whenever the gray code counters 350, 360 gets incremented or decremented by one (1). The output of gray code counters 350, 360 may be communicated to an input of flag generator block 320. In one aspect of the invention, the output of gray code counter 350 may be converted back to normal binary representation and may be sent to FIFO buffer 310 where it may be used to indicate the next FIFO location that is to be written.

During reading of the FIFO buffer 310, the read pointer 380 may be decremented or incremented by the read clock rd_clk signal 399. The output of the read pointer 380 may be a binary number. This binary number may be converted to a gray code output by gray code counter 360. The gray code output may be a digitally represented output, in which consecutive outputs differ by only one bit change whenever the gray code counter 360 gets incremented or decremented by one (1). The output of gray code counter 360 may be communicated to an input of flag generator block 320. The output of gray code counter 360 may also be converted back to normal binary representation and may be sent to FIFO buffer 310 where it may be used to indicate the next FIFO location that is to be read.

The output of gray code counter 350 may indicate a number of FIFO positions that may have to be written for a current video line. The output of gray code counter 360 may be configured to indicate the number of FIFO positions have been read out for the current video line. When the end of a video line being written to the FIFO buffer 310 or read out of the FIFO buffer 310 has been reached, the corresponding write pointer 370 and read pointer 380 may be reset to their original starting values.

The flag generator block 320 may be configured to compare the output of the two gray code counters and generate various flag outputs based on the comparison. For example, a flag indicating that the FIFO buffer 310 is full may be generated to indicate when the read side of the FIFO buffer 310 is ready to be read out. Similarly, a flag indicating that the FIFO buffer 310 is empty may be generated to indicate when the write side of the FIFO buffer is ready to be written to. Not withstanding, when the write pointer 370 or the read pointer 380 reaches the end of a video line and has to be reset or rolled over, the logic in the flag generator block 320 may cause a non-gray code transition at the output of the gray code counters 350, 360. This non-gray code transition may be the result of the flag generator block 320 failing to determine and track when the read pointer 380 and/or the write pointer 370 gets reset or rolled over.

Whenever this occurs, the flag generator block 320 may assert a false flag. For example, upon reset of the read pointer 380, a false flag may get generated indicating that the FIFO buffer 310 may be at half its capacity even though it may actually be empty. This may result in the read side of the FIFO buffer 310 attempting to continue to read out certain positions of the FIFO buffer 310 even though those positions have not been re-written with the next line of video data.

In an embodiment of the invention, the problem associated with the generation of false flags may be solved by gradually incrementing or decrementing the gray code counters upon reset of the read pointer 380 and/or the write pointer 370. On the write side, when a current line of video data has been completely written or the end of current video line is reached, instead of immediately resetting the write pointer 370 to its original starting state, the write pointer may be gradually decremented or incremented until it reaches its starting state. As a result, logic and/or suitable logic in the flag generator block 320 may respond appropriately and no flags may be generated that may indicate an incorrect state of the FIFO buffer 310. Similarly, on the read side, when a current line of video data has been completely read out of the buffer or end of the video line has been reached, instead of immediately resetting the read pointer 380 to its original starting state, the read pointer may be gradually incremented or decremented until it reaches its starting or initial state. Again, no flags may be generated that may indicate an incorrect state of the FIFO buffer 310.

In a second embodiment of the invention, the flag generator block 320 may be gated or otherwise configured so that no incorrect flags are generated during a reset or roll over time interval for the gray code counters 350, 360. Accordingly, flags generated during the reset time interval may be ignored. In this case, read and write operations to the FIFO buffer 310 may be disabled and any attempt to write to or read from the FIFO buffer 310 may be barred to prevent the generation of flags. In summary, certain embodiments of the present invention afford an approach to reset a gray code counter without generating flags that falsely indicate a state of a FIFO buffer.

In accordance with the various aspects of the invention, it should be recognized that the various states illustrated may be changed or otherwise altered without departing from the spirit and attributes of the invention. Additionally, varying states may be defined between full and empty, which conforms to the scope of the invention.

The present invention may be realized in hardware, software, or a combination of hardware and software. In this regard, the present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope or essential attributes of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for altering a gray code counter, the method comprising:

in response to an indication that a data buffer controlled by the gray code counter has attained one of a plurality specified states in which a current line of video data is completely written or reached, gradually decrementing or incrementing a write pointer associated with said data buffer until said write pointer reaches a starting write state from which said write pointer started; and in response to an indication that said data buffer controlled by the gray code counter has attained one of said plurality of specified states in which the current line of video data is completely read or reached, gradually decrementing or incrementing a read pointer associated with said data buffer until said read pointer reaches a starting read state from which said read pointer started.

2. The method according to claim 1, wherein said data buffer is a first-in-first-out (FIFO) buffer.

3. The method according to claim 2, wherein said first-in-first-out (FIFO) buffer is an asynchronous first-in-first-out buffer.

4. The method according to claim 1, wherein said data buffer is adapted to buffer one or both of voice data and/or video data.

5. The method according to claim 1, wherein said plurality of specified states comprises full, empty, and a predefined level.

6. The method according to claim 1, wherein said gradually decrementing and incrementing are not immediate.

7. A method for altering a gray code counter, the method comprising:

in response to an indication that a data buffer controlled by the gray code counter has attained one of a plurality specified states in which a current line of video data is completely written or reached, gradually decrementing or incrementing a write pointer associated with a data buffer until said write pointer reaches a starting write state from which said write pointer started, and disabling any attempt to write to said data buffer until said starting write state is reached; and in response to an indication that said data buffer controlled by the gray code counter has attained said one of said plurality of specified states in which the current line of video data is completely read or reached, gradually decrementing or incrementing a read pointer associated with said data buffer until said read pointer reaches a starting read state from which said read pointer started, and disabling any attempt to read from said data buffer until said starting read state is reached.

8. The method according to claim 7, wherein said data buffer is a first-in-first-out (FIFO) buffer.

9. The method according to claim 8, wherein said first-in-first-out (FIFO) buffer is an asynchronous first-in-first-out buffer.

10. The method according to claim 7, wherein said data buffer is adapted to buffer one or both of: voice data and/or video data.

11. The method according to claim 7, wherein said disabling any attempt to write to said data buffer further comprises disabling generation of at least one flag until said starting write state is reached.

12. The method according to claim 7, wherein said disabling any attempt to read from said data buffer further comprises disabling generation of at least one flag until said starting read state is reached.

13. The method according to claim 7, wherein said plurality of specified states comprises full, empty, and a predefined level.

14. The method according to claim 7, wherein said gradually decrementing and incrementing are not immediate.

15. A system for altering a gray code counter, the system comprising:

a decrementer for gradually decrementing a read pointer or a write pointer associated with a data buffer until a starting value of said read pointer or said write pointer is reached in response to an indication that a data buffer controlled by the gray code counter has attained one of a plurality specified states in which a current line of video data is completely written or read; and an incrementer for gradually incrementing the read pointer or the write pointer associated with said data buffer until the starting value of said read pointer or said write pointer is reached in response to an indication that said data buffer controlled by the gray code counter has attained one of said plurality of specified states in which the current line of video data is completely written or read.

16. The system according to claim 15, wherein said data buffer is a first-in-first-out (FIFO) buffer.

17. The system according to claim 16, wherein said first-in-first-out (FIFO) buffer is an asynchronous first-in-first-out buffer.

18. The system according to claim 17, wherein said data buffer is adapted to buffer one or both of: voice data and/or video data.

19. The system according to claim 15, further comprising a flag generator for comparing an output of a write gray code counter associated with said write pointer and an output of a read gray code counter associated with said read pointer.

20. The method according to claim 15, wherein said plurality of specified states comprises full, empty, and a predefined level.

21. The system according to claim 15, wherein said gradually decrementing and said gradually incrementing are not immediate.

22. A machine-readable storage, having stored thereon a computer program having at least one code section for altering a gray code counter, the at least one code section executable by a machine for causing the machine to perform the steps comprising:

gradually decrementing or incrementing a write pointer associated with a data buffer until said write pointer reaches a starting write state from which said write pointer started; and gradually decrementing or incrementing a read pointer associated with said data buffer until said read pointer reaches a starting read state from which said read pointer started.

23. The machine-readable storage according to claim 22, wherein said at least one code section controls a first-in-first-out (FIFO) buffer.

24. The machine-readable storage according to claim 23, wherein said at least one code section controls an asynchronous first-in-first-out buffer.

25. The machine-readable storage according to claim 22, wherein said at least one code section controls a buffering of one or both of: voice data and/or video data in said data buffer.

26. The machine-readable storage according to claim 22, wherein said gradually decrementing and incrementing are not immediate.

* * * * *

UNITED STATES PATENT AND TRADEMARK OFFICE
CERTIFICATE OF CORRECTION

PATENT NO. : 7,636,834 B2 Page 1 of 1
APPLICATION NO. : 10/302489
DATED : December 22, 2009
INVENTOR(S) : Tang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 596 days.

Signed and Sealed this

Ninth Day of November, 2010

David J. Kappos
*Director of the United States Patent and Trademark Office*